UNITED STATES PATENT OFFICE.

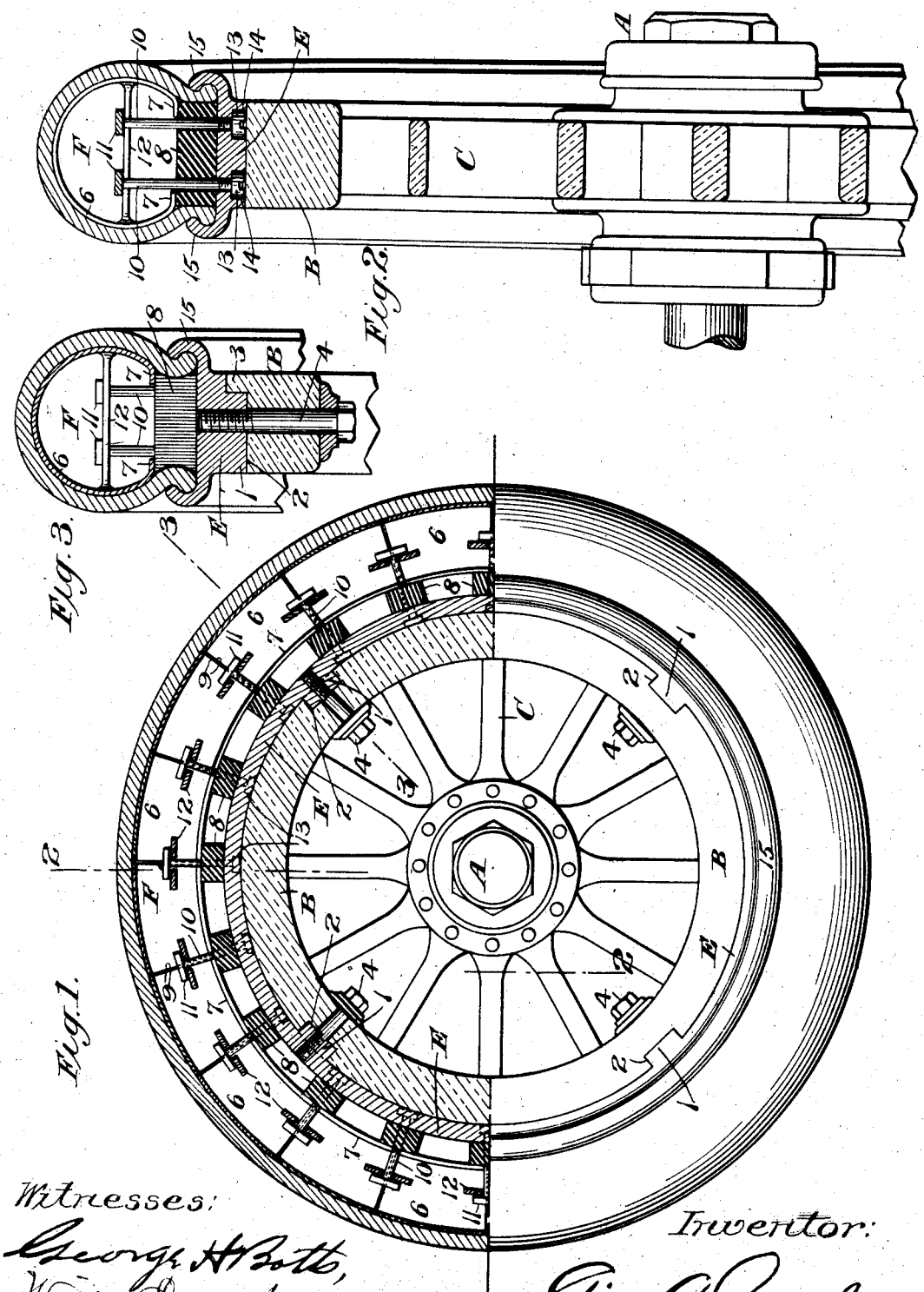

GEORGE A. PEARSE, JR., OF NEW YORK, N. Y.

VEHICLE-TIRE.

No. 873,957.

Specification of Letters Patent.

Patented Dec. 17, 1907.

Application filed March 9, 1907. Serial No. 361,474.

*To all whom it may concern:*

Be it known that I, GEORGE A. PEARSE, Jr., a citizen of the United States, residing in the city, county, and State of New York, have invented certain new and useful Improvements in Vehicle-Tires, fully described and represented in the following specification and the accompanying drawings, forming a part of the same.

This invention has for its object to produce a simple and effective wheel of the resilient type in which a non-puncturable tire of novel construction is employed in connection with the felly, the tire being held in position on the felly by means which permit the tire to be readily attached to or removed from the felly, and the invention consists in certain constructions, improvements and combinations as will be hereinafter described and specifically pointed out.

In the accompanying drawings—Figure 1 is a side view of a vehicle wheel partly in section having a tire embodying the invention attached. Fig. 2 is a section, on an enlarged scale, taken on the line 2—2 of Fig. 1. Fig. 3 is a section taken on the line 3—3 of Fig. 1, showing the means for attaching the tire to the felly.

Referring to the drawings, A is the hub of the wheel which is of the form commonly used on automobiles; B is the felly secured to the hub A by the usual spokes C.

The tire D is composed of an outer sectional rim F and an inner rim E of any suitable material, preferably of steel, which is attached to the felly B in any convenient way.

As shown in the drawings, the ring E is formed with or has secured to it inwardly projecting lugs 1 extending for some distance across the inner periphery of the ring E. These lugs 1 are adapted to enter grooves 2 formed on the outer periphery of the felly B. The grooves 2 do not extend the full width of the face of the felly, shoulders 3 being thereby formed on the periphery of the said felly and against which the lugs 1 abut when the tire is placed in position on the felly. The shoulder 3 and the lug 1 are so positioned on the felly B and ring E, respectively, that the ring and felly will be in proper alinement one to the other, in which position they are firmly secured together by bolts or screws 4, as shown in Figs. 1 and 3.

The outer rim F of the tire consists of a plurality of U or similar shaped sections 6, the inner edges of which are turned inwardly to form flanges 7 which abut against blocks of elastic material 8 interposed between the sections 6 of the rim F and the ring E. The U shaped sections 6 are preferably of steel having a suitable resiliency and while the blocks 8 are shown as of rubber, they may be, however, of any suitable elastic material having the proper resiliency. The end edges 9 of the sections 6 of the rim F are radial and are slightly separated so as to allow for the inward radial movement of the sections due to the outward pressure upon the rim when in use. The blocks 8 are preferably of a length equal to the width of the face of the ring E, the flanges 7 of the sections 6 resting on them, as shown in Fig. 2, each block being so positioned circumferentially on the ring E as to support the adjacent edges 9 of two adjoining sections, as shown in Fig. 1. The blocks 8 are secured in position on the periphery of the ring E by headed bolts or screws 10 secured to the ring E, and which pass freely through the blocks 8, the bolts having at their outer ends heads 11 which normally rest above transverse bars or plates 12 secured to or forming a part of the sections 6, and at their inner ends provided with adjusting nuts 13 which enter openings 14 formed on the inner periphery of the ring E. While I have shown two of the bolts 10 for each section, it will be understood that this number may be changed and any number of bolts necessary may be used, the inner edges 7 of the sections 6 bearing against the bolts 10 preventing lateral movement of the sections making up the rim F and holding the blocks 8 in place on the ring E.

The rim F is provided with an outer covering G preferably of rubber, which is secured to the ring E by the upturned edges 15 secured to or forming a part of the ring E, as shown in Fig. 2.

When pressure is applied to one or more of the sections, it will be forced inwardly, compressing the elastic blocks 8, the bars 12 moving inwardly away from the heads 11 of the bolts 10, and upon the pressure being removed from the said section or sections, they will be forced outwardly by the blocks 8 until the bars 12 engage the heads 11 of the bolts 12 which act as a stop to prevent the sections 6 from being forced outwardly too far and thus destroy the curvature of the rim.

It will be seen from the drawings and description that I provide a cheap and efficient non-puncturable tire, easily removed from and attached to the felly of the wheel, and while I have shown what I consider the preferable form, it will be understood that the construction may be changed within wide limits without departing from my invention.

What I claim is:—

1. In a vehicle tire, the combination of a circular rim consisting of U shaped sections having an elastic outside covering, of a ring adapted to be mounted on the felly, means for securing the ring to the felly, and elastic blocks interposed between the ring and the U shaped sections comprising the rim, substantially as described.

2. In a vehicle tire, the combination of a covered rim consisting of U shaped sections, of a ring adapted to be mounted on the felly, means for securing the ring to the felly, of elastic blocks interposed between the ring and the U shaped sections comprising the rim, and means for retaining the ring, the U shaped sections and the elastic blocks in the proper relation one to the other, substantially as described.

3. In a vehicle tire, the combination of a covered rim consisting of U shaped sections, of a ring provided with inwardly projecting lugs, of a felly having recesses formed in the outer periphery thereof, and adapted to receive the said lugs, bolts for securing the ring and felly together, of elastic blocks interposed between the ring and the edges of the U shaped sections comprising the rim, and headed bolts secured to the ring and passing freely through the elastic blocks and engaging bars secured to the U shaped sections to prevent excessive outward movement of the said sections, substantially as described.

In testimony whereof, I have hereunto set my hand, in the presence of two subscribing witnesses.

GEORGE A. PEARSE, JR.

Witnesses:
GEORGE H. BOTTS,
WILLIAM ECKENFELDER.